US00RE44907E

(19) United States
(12) Reissued Patent
Kanaris

(10) Patent Number: US RE44,907 E
(45) Date of Reissued Patent: May 27, 2014

(54) CONVEYOR DRIVE ROLLER

(71) Applicant: Alexander D. Kanaris, Richmond Hill (CA)

(72) Inventor: Alexander D. Kanaris, Richmond Hill (CA)

(73) Assignee: Alexander D. Kanaris, Richmond Hill, ON (CA)

(21) Appl. No.: 13/986,579

(22) Filed: May 16, 2013

Related U.S. Patent Documents

Reissue of:
(64) Patent No.: 8,292,064
Issued: Oct. 23, 2012
Appl. No.: 12/851,833
Filed: Aug. 6, 2010

U.S. Applications:
(63) Continuation of application No. 12/176,700, filed on Jul. 21, 2008, now Pat. No. 7,806,252.

(30) Foreign Application Priority Data

Feb. 5, 2008 (CA) ..... 2619247

(51) Int. Cl.
*B65G 13/06* (2006.01)

(52) U.S. Cl.
USPC ..... 198/788; 198/782

(58) Field of Classification Search
USPC ..... 198/780, 781.07, 788, 789, 791
See application file for complete search history.

(56) References Cited

U.S. PATENT DOCUMENTS

| | | | |
|---|---|---|---|
| 1,725,740 | A | 8/1929 | Schulte |
| 2,175,860 | A | 10/1939 | Waimann |
| 2,941,411 | A | 6/1960 | Wilhelm et al. |
| 3,056,054 | A | 9/1962 | Christian |
| 3,268,066 | A | 8/1966 | Kishimoto |
| 3,599,769 | A | 8/1971 | Gardella |
| 4,013,166 | A | 3/1977 | Weady et al. |

(Continued)

FOREIGN PATENT DOCUMENTS

| | | | |
|---|---|---|---|
| CA | 2 177 797 | | 12/1996 |
| DE | 32 15921 | A1 | 3/1983 |
| NL | 1 018 072 | C2 | 11/2002 |
| WO | 03/008307 | A1 | 1/2003 |

OTHER PUBLICATIONS

European Search Report for International Application No. EP 0801 0447, dated May 20, 2009.

(Continued)

*Primary Examiner* — James R Bidwell
(74) *Attorney, Agent, or Firm* — Hoffmann & Baron, LLP

(57) ABSTRACT

There is disclosed a conveyor drive roller of the type which may be used for example for supporting and driving a conveyor medium. The conveyor drive roller has a hollow drum which defines a cylindrically shaped rotatable supporting surface, and an internal surface. The hollow drum is rotatably connected to a first and a second support structure. An internal gear assembly is disposed inside of the hollow drum and operably connected to the internal surface of the hollow drum. The second support structure is adapted to permit a rotor of a motor located outside of the hollow drum to releasably couple to the internal gear assembly through the second support structure, so that when the rotor is coupled to the internal gear assembly, through the second support structure, rotation of the rotor is transmitted by the internal gear assembly to the hollow drum to cause rotation of the hollow drum about the first and second support structures.

24 Claims, 6 Drawing Sheets

(56) References Cited

U.S. PATENT DOCUMENTS

| | | | |
|---|---|---|---|
| 4,082,180 | A | 4/1978 | Chung |
| 5,048,672 | A | 9/1991 | Sundseth |
| 5,088,596 | A | 2/1992 | Agnoff |
| 5,143,184 | A | 9/1992 | Snyder et al. |
| 5,413,209 | A | 5/1995 | Werner |
| 5,437,585 | A | 8/1995 | Sundseth |
| 5,442,248 | A | 8/1995 | Agnoff |
| 5,642,799 | A | 7/1997 | Warrilow |
| 5,732,813 | A | 3/1998 | Nielsen et al. |
| 6,082,528 | A | 7/2000 | Habberley |
| 6,419,070 | B1 | 7/2002 | Agnoff |
| 6,443,295 | B1 | 9/2002 | Hill |
| 6,612,422 | B2 | 9/2003 | Roberts et al. |
| 6,722,493 | B2 | 4/2004 | Matsuoka et al. |
| 6,755,299 | B2 | 6/2004 | Itoh et al. |
| 6,766,900 | B2 | 7/2004 | Kanaris |
| 6,837,364 | B2 | 1/2005 | Kanaris |
| 6,907,984 | B2 | 6/2005 | Cespedes et al. |
| 7,207,433 | B2 | 4/2007 | Schaefer |
| 7,299,915 | B2 | 11/2007 | El-Ibiary |
| 7,806,252 | B2 | 10/2010 | Kanaris |
| 2005/0109585 | A1 | 5/2005 | Kanaris |
| 2006/0151299 | A1 | 7/2006 | Schaefer |

OTHER PUBLICATIONS

English Abstract corresponding to a foreign reference, NL 1 018 082 C2.

CONVEYOR DRIVE ROLLER

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the priority to U.S. patent application Ser. No. 12/176,700, filed Jul. 21, 2008, titled "CONVEYOR DRIVE ROLLER," now U.S. Pat. No. 7,806,252, which issued on Oct. 5, 2010, and Canadian Application No. 2619247, filed Feb. 5, 2008, titled "CONVEYOR DRIVE ROLLER," the contents of which are incorporated by reference herein.

FIELD OF THE INVENTION

The present invention relates generally to conveyor roller systems for conveying or moving objects from one place to another. Conveyor systems generally employ a series of rollers on which a continuous belt or other conveyor medium travels. Some of the rollers in such a system act as drive rollers and are rotated to move the belt. The present invention relates, in particular, to conveyor drive rollers driven by electric motors for use in such conveyor belt systems.

BACKGROUND OF THE INVENTION

A variety of conveyor roller systems have been designed and utilized. A large variety of known conveyor systems comprise a continuous belt or conveyor medium which travels over a series of conveyor rollers.

Early conveyor roller systems utilized at least one conveyor drive roller which was driven by an electric motor positioned outside of, and connected to, the conveyor drive roller typically via a chain or rubber belt, and often with an external gear assembly positioned between the motor and the conveyor roller. The conveyor drive roller thereby translated the rotational movement of the electric motor to linear movement of the conveyor medium. The main disadvantage of these early designs, which are still utilized today, is that they take up a lot of space. However, the exposed moving parts also pose a hazard to workers, especially the external gear assembly and chain from the external gear assembly to the conveyor roller, which output high levels of torque, as compared to the motor on its own. The exposed moving parts also pick up debris which damages the conveyor roller system.

In later conveyor roller systems, the electric motor was arranged within the conveyor drive roller to provide a more compact conveyor roller system as taught, for example, in U.S. Pat. No. 1,725,740 to Schulte.

An example of an even more advanced conveyor drive roller is disclosed in U.S. Pat. No. 5,088,596 to Agnoff; which teaches a motorized conveyor drive roller mounted in a conveyer frame to support and propel articles from one end of the conveyor path towards the opposite end. The Agnoff conveyer drive roller includes a roller tube rotatably mounted in the conveyor frame and drive means contained inside the roller tube for driving the roller tube. The drive means includes a motor, a gear reducer assembly operatively connected to the motor, and a drive member connected to the outward shaft of the speed reducer for engaging and rotating the roller tube.

Conveyor roller systems having conveyor drive rollers which are driven by motor and gear combinations, contained entirely within the conveyor drive roller itself, are of particular utility in many applications. The internal motor and gear system makes for a compact, space saving installation. Furthermore, the linear arrangement of the motor and gearing within the conveyor drive roller means that the transmission of power from the motor to the roller is carried out more directly resulting in higher levels of efficiency than is possible in conventional conveyor roller systems where the motor is located externally to the conveyor drive roller, especially where the axis of rotation of the rotor is at a 90° angle to the axis of rotation of the roller. The internal motor and gear combination also largely eliminates the risk of accident caused by contact with employees. Furthermore, it eliminates contamination of the motor/gear drive from dust and debris in the environment in which it is running, thereby greatly reducing maintenance, and the likelihood of failure, all of which results in less down time for the conveyor system.

All of these factors make the use of such conveyor drive rollers particularly useful and desirable. However, they also have disadvantages.

One such disadvantage is that while the likelihood of failure of such a conveyor drive roller is decreased, when it does fail servicing is very difficult and expensive, since it requires the shutting down of the conveyor roller system, removal of the entire defective conveyor drive roller (which is quite heavy since it contains the motor and gearing), which is then sent elsewhere for servicing. The conveyor roller system remains shut down until a new or repaired conveyor drive roller is installed in the conveyor system in place of the removed, defective one. Since conveyor drive rollers of this type (i.e. having the motor and gearing within them) are fairly expensive, companies that employ conveyor systems which utilize them typically do not stock spare conveyor drive rollers. This means that the conveyor system remains shutdown until the defective conveyor drive roller is repaired and reinstalled.

Therefore, there is a need for improvement in the design of conveyor drive rollers.

SUMMARY OF THE INVENTION

Although mechanical breakdown of conveyor drive motors in which the motor and gear mechanism is entirely contained within the conveyor drive roller itself is far less likely than traditional conveyor drive rollers, they do still break down. It is typically the motor which fails in such units. However, accessing and repairing the motor when it is located inside the conveyor drive roller requires special tooling and significant time, and expense as described above.

Therefore, what is desired is a conveyor drive roller which has the advantages of the prior art conveyor drive rollers with the internal motor and gear combination, but which results in less down time when a failure in the motor occurs, by virtue of the motor being outside of the drive roller where it can be more easily accessed, repaired, and/or replaced.

Accordingly, the present invention provides a conveyor drive roller in which the gear assembly is contained inside a sealed conveyor drive roller and protected from the environment, while the electric motor is located outside of the conveyor drive roller and connected to the internal gear assembly. This facilitates preventative servicing and maintenance, and simplifies replacement and repair of the motor if it fails.

Furthermore, workers near the conveyor drive roller are protected from accidentally coming into contact with the moving parts of the gear assembly (since it is located within the conveyor drive roller), which may cause physical damage or catch any loose clothing into the system, as may otherwise occur in a conventional conveyor drive roller, in which the gear reducer, motor, couplings, and belts or chains are exposed outside of the roller.

Another advantage is that with the internal gear assembly and external motor, the conveyor drive roller of the conveyor drive roller of the present invention is more compact than the conventional drive roller, in which the gear reducer, motor, couplings, and belts or chains are outside of the roller.

Yet another advantage of the conveyor drive roller of the present invention is that by locating the motor outside of the conveyor drive roller the motor does not need to be sold with the conveyor drive roller. This allows the user to purchase an economical spare motor, from any supplier, to be kept in stock in case it becomes needed to replace a defective motor. The replacement of the motor in this invention is much faster and easier than replacing the motor in a drive roller where the motor is located within the roller. This arrangement also allows the user to select from a range of standard motors when building the conveyor system, or to upgrade or change an installed conveyor system to perform in a different application or environment.

Yet another advantage is that by coupling the external motor directly to the internal gear assembly and aligning the axis of rotation of the rotor parallel with the axis of rotation of the conveyor drive roller the transfer of power from motor to roller is very efficient. Such an arrangement results in energy cost savings relative to conventional conveyor drive rollers, in which the axis of rotation of the rotor is typically at a 90° angle to the axis of rotation of the roller, for space conservation.

Therefore, in accordance with one aspect of the present invention there is provided a conveyor drive roller comprising:

a hollow drum defining a rotatable supporting surface having a cylindrical shape and an internal surface, said hollow drum being rotatably connected to a first and a second support structure;

an internal gear assembly disposed inside said hollow drum and operably connected to said internal surface of said hollow drum;

said second support structure being adapted to permit a rotor of a motor located outside of said hollow drum to releasably couple to said internal gear assembly through said second support structure;

wherein when said rotor is coupled to said internal gear assembly, through said second support structure, rotation of said rotor is transmitted by said internal gear assembly to said hollow drum to cause rotation of said hollow drum about said first and second support structures.

In accordance with another aspect of the present invention there is provided a conveyor drive roller comprising:

a hollow drum defining a rotatable supporting surface having a cylindrical shape, said hollow drum being rotatably connected to a first and a second support structure;

an internal gear assembly disposed inside said hollow drum and operably engaging said hollow drum;

a rotatable element rotatably carried by said second support structure, said rotatable element having two ends, one of said ends operably engaging said internal gear assembly, and the other of said ends being adapted to couple to a rotor of a motor;

wherein when said rotor is coupled to said other end of said rotatable element, rotation of said rotor is transmitted by said rotatable element and said internal gear assembly to said hollow drum to cause rotation of said hollow drum about said first and second support structures.

In accordance with yet another aspect of the present invention there is provided a conveyor drive roller for supporting and driving a conveyor medium, said conveyor drive roller comprising:

a hollow drum defining a rotatable supporting surface having a cylindrical shape, said hollow drum being rotatably connected to a first and a second support structure, said second support structure having a channel therethrough, and an exterior end adapted to mount a motor with a rotor;

an internal gear assembly disposed inside the hollow drum;

said internal gear assembly being operably connected to said hollow drum;

said internal gear assembly also being adapted to operably couple to said rotor;

wherein when said motor is mounted to said exterior end and said internal gear assembly is operably coupled to said rotor, through said hollow channel, rotation of said rotor is transmitted by said internal gear assembly to said hollow drum to cause rotation of said hollow drum about said first and second support structures.

BRIEF DESCRIPTION OF THE DRAWINGS

Reference will now be made to the preferred embodiments of the present invention with reference, by way of example only, to the following drawings in which.

DETAILED DESCRIPTION OF THE PREFERRED EMBODIMENTS

The present invention is described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein. In the figures, like elements are given like reference numbers. For the purposes of clarity, not every component is labelled in every figure, nor is every component of each embodiment of the invention shown where illustration is not necessary to allow those of ordinary skill in the art to understand the invention.

Figure 1:
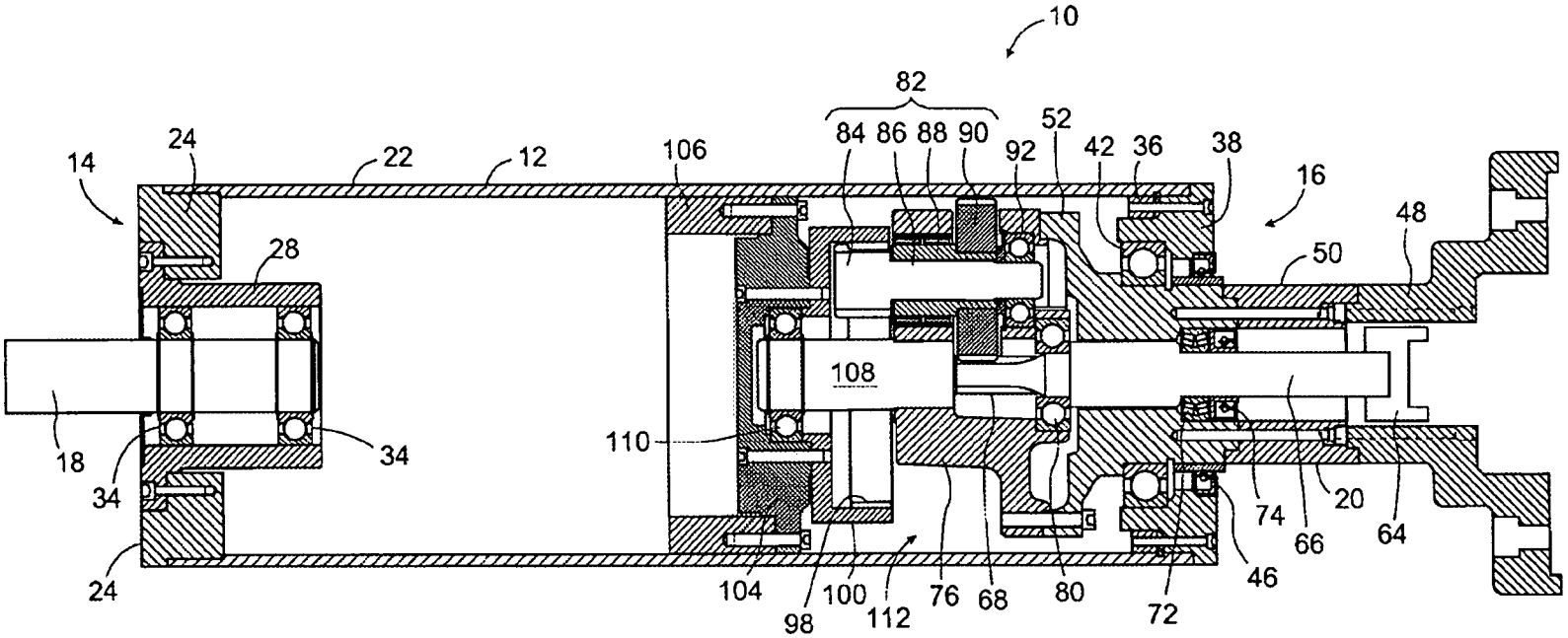
FIG. 1 is a full cross-sectional view of a conveyor drive roller according to an embodiment of the present invention.

A conveyor drive roller 10 according to the present invention is disclosed in FIG. 1. The conveyor drive roller 10 consists of a cylindrical drum 12, having ends 14 and 16. Stationary shafts 18 and 20 extend through respective ends 14, 16. The stationary shafts 18 and 20 can be mounted on any suitable support or frame work (not shown) and secured on for example blocks or clamps (not shown), all of which is known and requires no detailed description.

The conveyor media (not shown) typically a belt or flexible strip of any suitable material, or a matrix of chain links, or the like runs around the outer surface 22 of the drum 12 and is driven by drum 12, which rotates about shafts 18 and 20. Such conveyor media may also run around other conveyor drive rollers (not shown), and may run over intermediate support rollers (not shown). Furthermore the outer surface 22 can include any variety of means to increase the co-efficient of friction between the outer surface 22 and the conveyor medium such as for example by knurling or machining a spiral at each end toward the center or by covering the outer surface 22 with rubber or the like.

Figure 2:
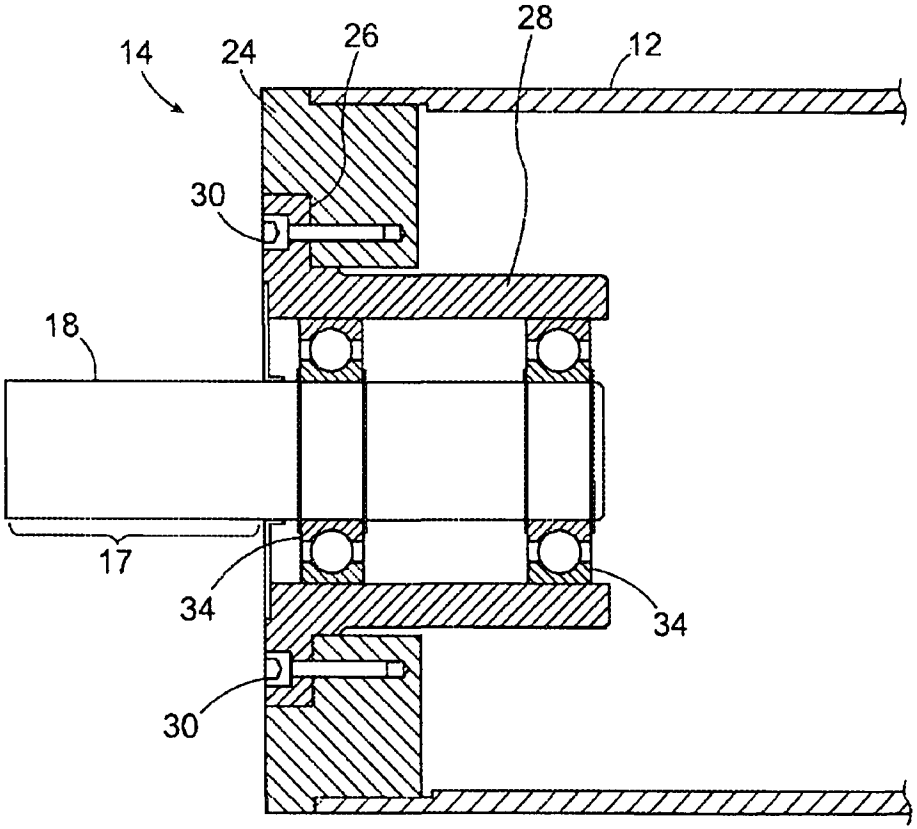
FIG. 2 is partial view of a cross-section of one end of the conveyor drive roller of FIG. 1.

As shown in FIG. 2 in an enlarged view of end 14, an annular end flange 24, is press fit into the drive drum 12. The end flange 24 has a hole in the middle, which defines a lip 26 facing outside of the drive drum 12. A bearing cassette 28 is fit within the hole in the end flange 24. The cassette has a collar 32 for securement to the lip 26 of the end flange 24 by fasteners 30, such as socket head caps as shown. Two spaced apart bearings 34 are positioned within the cassette 28 about the shaft 18. The exterior portion 17 of shaft 18 is preferably mountable on, and securable to, a suitable support or frame work (not shown). For example, the exterior portion 17 of shaft 18 may have a generally cylindrical profile with two flat sections at opposite sides, for locking in a U-shaped member, or clamp on the frame. Furthermore, although two bearings 34 are preferred in order to reduce the amount of play on the shaft 18, as is well known in the art, it is contemplated that one bearing positioned in the cassette 28 will also work. It is also contemplated that the end flange 24 and cassette 28 may be provided as a unitary construction. What is important is that drum 12 is rotatably connected to shaft 18 at end 14.

Figure 3:
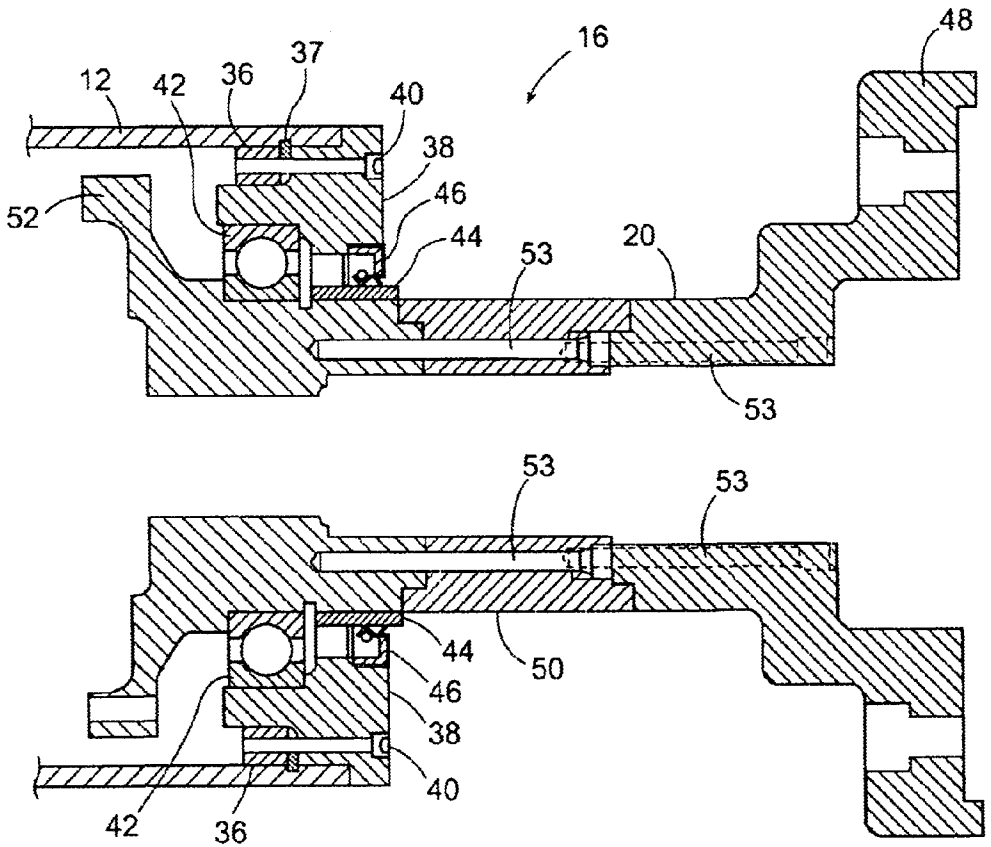
FIG. 3 is a partial view of a cross-section of the other end of the conveyor drive roller of FIG. 1, with parts omitted for clarity.

FIG. 3 is an enlarged view of end 16, with parts omitted to more clearly show how drum 12 is rotatably connected to shaft 20. As shown, a securing ring 36 is press fit into the drive drum 12. End flange 38 is secured to the securing ring 36 by fasteners 40, such as socket head caps as shown, with a gasket 37 positioned between the securing ring 36 and the end flange 38. The end flange 38 is sized and shaped with a hole to accommodate bearing 42, bearing race and oil seal 46 about shaft 20. Preferably, shaft 20 has a hollow interior and comprises three components, namely a C-flange motor mount 48, an extender 50, and an internal gear assembly mount 52. C-flange motor mount 48 is preferably sized and shaped for mounting a motor 54 according to the National Electrical Manufacturers Association (NEMA) standards. The three components are secured together with fasteners 53 in a known manner. However, it will be appreciated that the shaft 20 may comprise more or fewer components. What is important is that drum 12 is rotatably connected to shaft 20 at end 16, and be capable of operably mounting an external motor 54. Shaft 20 is preferably mountable on, and securable to, a suitable support or frame work (not shown) at extender 50. For example, the exterior of extender 50 may have a generally cylindrical profile with two flat sections at opposite sides, for locking in a U-shaped member, or clamp on the frame.

As can now be understood shafts 18 and 20 form a support structure about which drum 12 can rotate, when mounted on a suitable frame (not shown).

Figure 4:
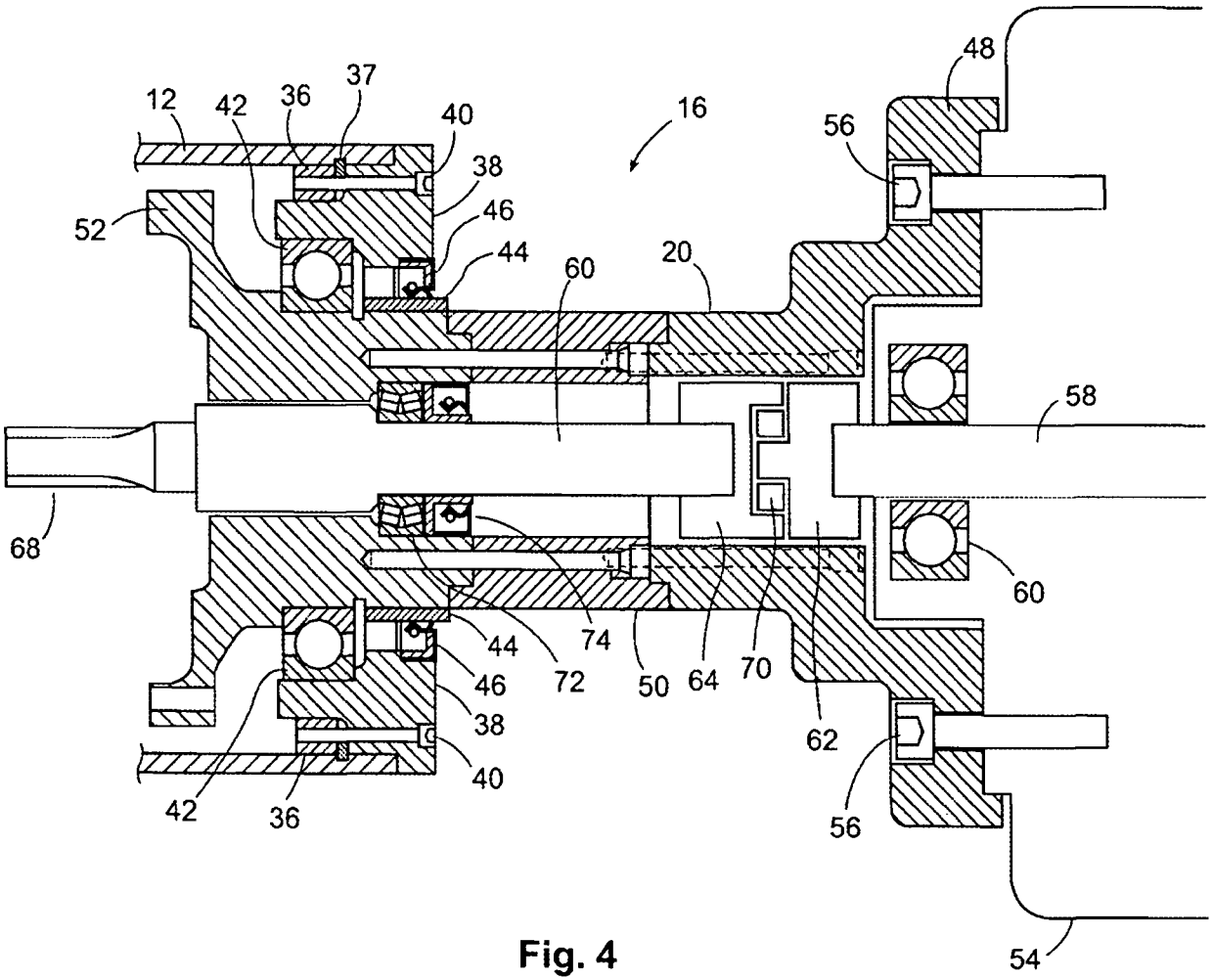
FIG. 4 is a partial view of a cross-section of the other end of the conveyor drive roller of FIG. 3 with omitted parts present and a motor mounted thereto.

FIG. 4 is an enlarged view of end 16, with parts omitted to more clearly show how motor 54 is coupled to the internal gear assembly (omitted from this view). As shown, motor 54 is a conventional electric motor, and is therefore not described in any more detail. Preferably the motor is sized and shaped in accordance with the NEMA standards, which will fit an appropriately sized and shaped C-flange motor mount 48 of shaft 20. The motor 54 is mounted to the C-flange motor mount 48 by fasteners 56, such as socket head caps as shown. The rotor 58 of the mounted motor 54 extends through bearings into the hollow of shaft 20. One half of a Lovejoy® coupling (i.e. LO 95) 62 is secured to the operative end of the rotor 58. The other half of the Lovejoy® coupling 64 is secured (i.e. by press fitting) to one end of a rotational element 66. The other end of the rotational element 66 has a pinion 68. A spider insert 70 is positioned between the two halves of the Lovejoy® coupling. As is known in the art the spider 70 has vibration dampening properties and misalignment correction capabilities, etc. While the preferred mode of coupling the motor 54 to the internal gear assembly is described as using a Lovejoy® coupling, it will be understood that many other types of coupling are possible and will be known to persons skilled in the art, such as a tongue and groove couplings. What is important is that the mode of coupling will permit the motor 54 to easily decouple from the rotational element 60, such as for example by simply sliding the motor 54 away from the C-flange motor mount 48. This permits easy access to the motor 54 for maintenance, repair and replacement, without necessitating the removal of the entire conveyor drive roller 10 from the conveyor frame (not shown). Thus, repair or replacement of a faulty motor 54 will typically result in only a brief down time of the conveyor. Furthermore, with the internal gear assembly being provided inside the drum 12, the conveyor drive roller 10 according to the present invention takes up less space as compared to a conventional conveyor drive roller (not shown) in which the gear reducer, motor, and couplings and belts or chains are all located outside of the conventional conveyor drive roller. Moreover, providing the internal gear assembly inside the drum 12 removes the possibility of debris (which can cause damage to the conventional conveyor drive roller), and especially worker's clothing being caught (which is a hazard), both of which possibilities are issues with conventional conveyor drive rollers in which the moving parts of the gear reducer, motor, couplings and belts or chains being exposed. The torque from the gear reducer and belts or chains is much higher, and more dangerous to nearby workers, than the torque from the motor itself.

With continued reference to FIG. 4, the rotational element 66 is shown preferably of unitary construction, and being sized and shaped to pass through the hollow of shaft 20 to extend past the gear assembly mount 52 inside the drum 12. Also shown are a bearing 72 and oil seal 74, between the gear assembly mount 52 and the mid portion of the rotational element 66. What is important is that the rotational element 66 be capable of transferring the torque from the rotor 58 of the motor 54 to the internal gear assembly (not shown in this view) through the hollow of shaft 20.

Figure 5:
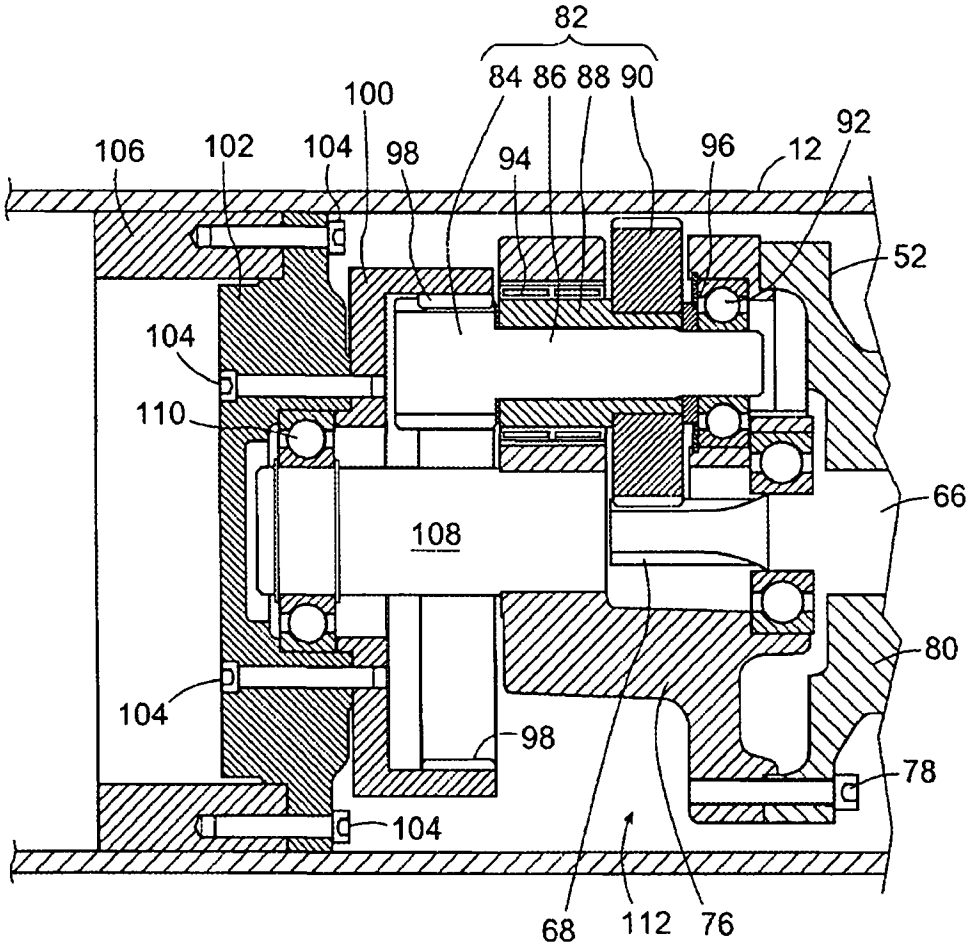
FIG. 5 is a partial view of a cross-section of a portion of the conveyor drive roller of FIG. 1 showing the internal gear assembly.

FIG. 5 is an enlarged view of a portion of the conveyor drive roller 10 containing the internal gear assembly according to a preferred embodiment of the present invention. As shown, a gear housing 76 is secured to the gear assembly mount 52 with fasteners 78 such as the one socket head cap which can be seen in this view. The gear housing 76 is sized and shaped to hold a bearing 80 about the rotational element 66 adjacent the pinion 68, and a drive gear 82 in engaging relation with the pinion 68. The drive gear 82 preferably comprises an output gear 84 with a shaft 86 extending therefrom, a sleeve 88 press fit about a portion of the shaft 86, and a gear 90 press fit about a portion of the sleeve 88. The drive gear 82 is rotatable in the gear housing 76 by bearing 92 and needle bearing 94. A spacer 96 is shown about the sleeve 94 between the gear 90 and the bearing 92 to prevent the gear 90 from rubbing against the gear housing 76. As can now be understood, the teeth of the pinion 68 mesh with the teeth of the gear 90 so that rotation of the rotational element 66 causes rotation of the drive gear 82 within the gear housing 76.

The teeth of the output gear 84 mesh with interior ring gear 98 on plate 100, which is secured to mid flange 102, which in turn is sealingly secured to a mounting ring 106 which is press fit inside the drum 12. As will be appreciated, the securement of the plate 100 to mid flange 102, and the mid flange 102 to the mounting ring 106 may be by fasteners 104. It is also contemplated that mounting ring 106, plate 100, and mid flange 102 may be provided as a unitary construction, or a two, or more piece construction. What is important is that rotational movement of output gear 84 is translated into a rotational movement of drum 12. Furthermore, it is preferable to extend a stabilizing shaft 108 from the gear housing 76, along the axis of rotation of the drum 12 to a bearing 110 held in mid flange 102 to help prevent the gear assembly from wobbling inside the drum 12 during use.

In a preferred embodiment of the present invention the internal gear assembly is configured to reduce the rate of rotational movement of the drum 12 relative to the rate of rotational movement of the rotor 58 by the motor 54. However, it will be appreciated that the internal gear assembly can be configured to also increase the rotational movement of the drum 12 relative to the rotational movement of the rotor 58 of motor 54. The use of gears and gear ratios to be used, which will be understood by those skilled in the art; and therefore, requires no detailed description.

A compartment 112 containing the gear assembly is formed between the mid flange 102 and end flange 38. Preferably, the compartment 112 is partly filled with gear oil, ensuring proper lubrication and cooling during operation of the conveyor drive roller 10.

In use, conveyor drive roller 10 is mounted to a frame (not shown) by shafts 18 and 20, in a manner which prevents shafts 18, 20 from rotating. When energised by operation of a suitable start switch (not shown) motor 54, spins rotor 58, which is coupled to rotational element 66 by the Lovejoy® coupling 60, 62, 64. Rotational element 66 has at its other end a pinion 68 which meshes with gear 90, at one end of drive gear 82, causing the output gear 84, at the other end of drive gear 82 to rotate in gear housing 76. Output gear 84 meshes with ring gear 98 which causes the drum 12 to rotate about stationary shafts 18 and 20, since output gear 84 is linked to the inside of the drum 12 by virtue of the securement to mid plate 102 and ultimately to the inside of the drum 12 via mounting ring 106. Rotation of drum 12 in turn causes movement of the conveyor media (not shown) carried on drum 12, which will move any product on the conveyor along its desired path.

The inline mounting of the motor 54 to the conveyor drive roller 10 according to the present invention, wherein the motor 54 is directly coupled to the internal gear assembly, and the rotor's 58 axis of rotation is parallel with the conveyor drive roller's 10 axis of rotation results in significant energy savings compared to conventional conveyor drive rollers with external gear reducers, motors, couplings, and belts or chains, because the transfer of power is much more efficient.

While reference has been made to various preferred embodiments of the invention other variations are comprehended by the broad scope of the appended claims. Some of these have been discussed in detail in this specification and others will be apparent to those skilled in the art.

Figure 6:
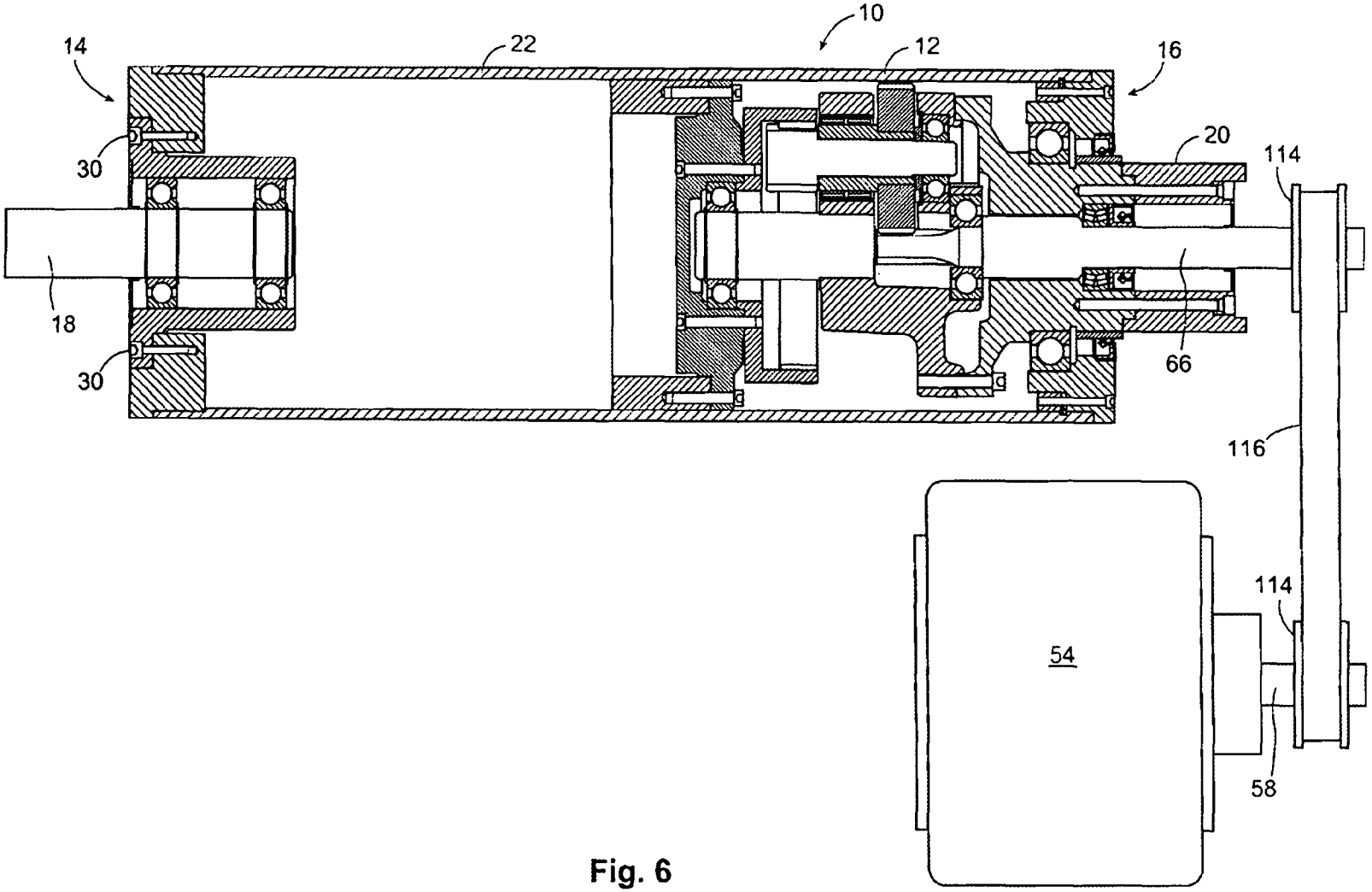
FIG. 6 is a full cross-sectional view of a conveyor drive roller according to another embodiment of the present invention.

For example, according to another embodiment of the present invention, it is contemplated that to take up less space, the motor 54 may be mounted underneath the drum 12. Accordingly, the conveyor drive roller 10 may be provided with a shaft 20 without the C-flange motor mount 48, and in place of the Lovejoy® coupler 64, the end of the rotational element 66 may be provided with a pulley 114. Thus, as shown by way of example in FIG. 6, the motor 54 is coupled to the rotational element 66 by a power transmission belt 116.

All such variations and alterations are comprehended by this specification are intended to be covered, without limitation.

What is claimed is:

1. A conveyor drive roller for supporting and driving a conveyor medium, said conveyor drive roller comprising:

a hollow drum defining a rotatable supporting surface having a cylindrical shape, said hollow drum being rotatably connected to a first and a second support structure, said second support structure having a passageway therethrough, and an exterior end comprising a motor mount sized and shaped to releasably receive, externally of said hollow drum, a motor;

an internal gear assembly disposed inside said hollow drum;

said internal gear assembly being operably connected to said hollow drum;

said internal gear assembly also being adapted to be releasably coupled to a motor;

wherein torque applied to said internal gear assembly is transmitted by said internal gear assembly to said hollow drum to cause rotation of said hollow drum about said first and second support structures;

further comprising a rotatable element at least partly supported by, and passing through said passageway in said second support structure, said rotatable element having a first end operably engaging said internal gear assembly, and a second end adapted to couple to a rotor of a motor, wherein said second end of said rotatable element has a coupling head for coupling with a corresponding coupling head on a rotor, each coupling head being formed with jaws configured to intermesh with an intermediate spider having lugs fitting between the jaws.

2. A conveyor drive roller as claimed in claim 1, wherein said coupling between a rotor and said other end of said rotatable element is a tongue and groove coupling.

3. A conveyor drive roller as claimed in claim 1, further comprising a motor.

4. A conveyor drive roller as claimed in claim 1, wherein said motor conforms to National Electrical Manufacturers Association (NEMA) standards.

5. A conveyor drive roller as claimed in claim 1, wherein said second support structure has an internal end, and said internal gear assembly is mounted thereto.

6. A conveyor drive roller as claimed in claim 5, further comprising an internal gear assembly mount.

7. A conveyor drive roller as claimed in claim 1, wherein said second support structure further comprises an extender.

8. A conveyor drive roller for supporting and driving a conveyor medium, said conveyor drive roller comprising:

a hollow drum defining a rotatable supporting surface having a cylindrical shape, said hollow drum being rotatably connected to a first and a second support structure, said second support structure having a passageway therethrough, and an exterior end comprising a motor mount sized and shaped to releasably mount a corresponding external motor with a rotor;

an internal gear assembly disposed inside said hollow drum;

said internal gear assembly being operably connected to said hollow drum;

said internal gear assembly also being adapted to releasably couple to said rotor;

wherein when said motor is mounted to said motor mount and said internal gear assembly is releasably coupled to said rotor, through said passageway, rotation of said rotor is transmitted by said internal gear assembly to said hollow drum to cause rotation of said hollow drum about said first and second support structures;

further comprising a rotatable element at least partly supported by, and passing through said passageway in said second support structure, said rotatable element having a first end operably engaging said internal gear assembly, and a second end adapted to couple to said rotor of said motor, wherein said second end of said rotatable element has a coupling head for coupling with a corresponding coupling head on said rotor, each coupling head being formed with jaws configured to intermesh with an intermediate spider having lugs fitting between the jaws.

9. A conveyor drive roller as claimed in claim 8, wherein said coupling between said rotor and said other end of said rotatable element is a tongue and groove coupling.

10. A conveyor drive roller as claimed in claim 8, wherein said motor conforms to National Electrical Manufacturers Association (NEMA) standards.

11. A conveyor drive roller as claimed in claim 8, wherein said second support structure has an internal end, and said internal gear assembly is mounted thereto.

12. A conveyor drive roller as claimed in claim 11, further comprising an internal gear assembly mount.

13. A conveyor drive roller as claimed in claim 8, wherein said second support structure further comprises an extender.

14. A conveyor drive roller adapted for use with an externally mounted motor, said conveyor drive roller comprising:

a hollow drum defining a rotatable supporting surface having a cylindrical shape and an internal surface, said hollow drum being rotatably connected to a first and a second support structure;

an external end on said second support structure, said external end being adapted to releasably receive, external from said hollow drum, a motor;

an internal gear assembly disposed inside said hollow drum and operably connected to said internal surface of said hollow drum;

a rotatable element rotatably carried by said second support structure, said rotatable element having a first end operably connected to said internal gear assembly, said first end having a first coupling head adapted to be attached to a motor, and a second end having a second coupling head being adapted to be coupled to said first coupling head on a motor, each of said first and second coupling heads being formed with jaws configured to intermesh with an intermediate spider having lugs adapted to fit between the jaws of said first and second coupling heads;

wherein when said first coupling head is coupled to said second coupling head via an intermediate spider, rotation is transmitted to said internal surface of said hollow drum, via said internal gear assembly, to cause rotation of said hollow drum about said first and second support structures.

15. The conveyor drive roller as claimed in claim 14, further comprising a motor.

16. The conveyor drive roller as claimed in claim 15, wherein said motor conforms to National Electrical Manufacturer Association (NEMA) standards.

17. The conveyor drive roller as claimed in claim 15, further comprising an intermediate spider.

18. The conveyor drive roller as claimed in claim 17, wherein said intermediate spider is adapted to dampen vibration transmission from said motor to said internal gear assembly.

19. The conveyor drive roller as claimed in claim 17, wherein said intermediate spider is adapted to dampen shock load from said motor to said internal gear assembly.

20. The conveyor drive roller as claimed in claim 17, wherein said intermediate spider comprises rubber or plastic.

21. The conveyor drive roller as claimed in claim 14, wherein said second support structure has an internal end, and said internal gear assembly is mounted to said internal end.

22. The conveyor drive roller as claimed in claim 21, further comprising an internal assembly mount on said internal end for mounting said internal gear assembly.

23. The conveyor drive roller as claimed in claim 14, wherein said second support structure further comprises an extender.

24. A conveyor drive roller comprising:

a hollow drum defining a rotatable supporting surface having a cylindrical shape and an internal surface, said hollow drum being rotatably connected to a first and a second support structure;

an internal gear assembly disposed inside said hollow drum and operably connected to said internal surface of said hollow drum; and a rotatable element rotatably carried by said second support structure, said rotatable element having a first end operably engaging said internal gear assembly, and a second end adapted to releasably couple to a rotor of an external motor;

said second support structure having an external end comprising a motor mount for releasably receiving, externally of said hollow drum, a motor adapted to be with the rotor releasably coupled to said second end of said rotatable element;

said second end of said rotatable element having a coupling head being adapted to be coupled to a corresponding coupling head on a motor, each coupling head being formed with jaws configured to intermesh with an intermediate spider having lugs fitting between the jaws;

wherein torque applied to said internal gear assembly is transmitted to said hollow drum to cause rotation of said hollow drum about said first and second support structures.

* * * * *

UNITED STATES PATENT AND TRADEMARK OFFICE

CERTIFICATE OF CORRECTION

PATENT NO. : RE44,907 E
APPLICATION NO. : 13/986579
DATED : May 27, 2014
INVENTOR(S) : Alexander D. Kanaris It is certified that error appears in the above-identified patent and that said Letters Patent is hereby corrected as shown below:

On the title page item (64), line 3, should read --Appln. No: 12/851,883.

Signed and Sealed this
Twenty-eighth Day of April, 2015

Michelle K. Lee

Michelle K. Lee
*Director of the United States Patent and Trademark Office*